United States Patent [19]

Bridges

[11] Patent Number: 4,545,878
[45] Date of Patent: Oct. 8, 1985

[54] METHOD AND APPARATUS FOR SEPARATING ISOTOPES USING ELECTROPHORESIS IN A DISCHARGE

[75] Inventor: William B. Bridges, Thousand Oaks, Calif.

[73] Assignee: Hughes Aircraft Company, El Segundo, Calif.

[21] Appl. No.: 375,504

[22] Filed: May 6, 1982

Related U.S. Application Data

[60] Continuation of Ser. No. 151,217, May 19, 1980, abandoned, which is a division of Ser. No. 700,362, Jun. 28, 1976, abandoned.

[51] Int. Cl.$^4$ .............................................. B01D 59/00
[52] U.S. Cl. .............................. 204/157.1 R; 250/282; 250/283; 250/284; 250/423 P; 422/186
[58] Field of Search ............... 55/2, 12; 250/281, 282, 250/283, 423 R, 423 P, 284; 204/157.1 H, 157.1 R, DIG. 11

[56] References Cited

U.S. PATENT DOCUMENTS

| | | | |
|---|---|---|---|
| 3,740,552 | 6/1973 | Pressman | 250/41.95 E |
| 3,987,302 | 10/1976 | Hurst et al. | 250/283 |
| 4,000,051 | 12/1976 | Kaldor | 204/157.1 R |
| 4,031,389 | 6/1977 | Russell et al. | 250/423 P |
| 4,090,856 | 5/1978 | Rogoff | 55/11 |
| 4,101,396 | 7/1978 | Silfvast | 204/157.1 R |
| 4,107,537 | 8/1978 | Forsen | 250/281 |
| 4,176,025 | 11/1979 | Chen et al. | 204/157.1 R |

OTHER PUBLICATIONS

Oettinger et al., "Plasma Ionization Enhancement by Laser Line Radiation", *AIAA Journal*, vol. 8, No. 5, (1970), pp. 880–885.

*Primary Examiner*—Deborah L. Kyle
*Attorney, Agent, or Firm*—Paul M. Coble; A. W. Karambelas

[57] ABSTRACT

A gaseous mixture containing elementary particles (atoms or molecules) of first and second isotopes is exposed to laser radiation at a predetermined frequency to excite elementary particles of the first isotope without substantially exciting elementary particles of the second isotope. An electric discharge is established in the gaseous mixture to produce preferential ionization of elementary particles of the first isotope. Electrophoresis in the discharge (either cataphoresis or the formation of a plasma sheath at the lateral extremity of the discharge) causes preferential migration of elementary particles of the first isotope to a first location and preferential migration of elementary particles of the second isotope to a second location. Portions of the gaseous mixture enriched in the first and second isotopes, respectively, are removed from the respective first and second locations.

3 Claims, 10 Drawing Figures

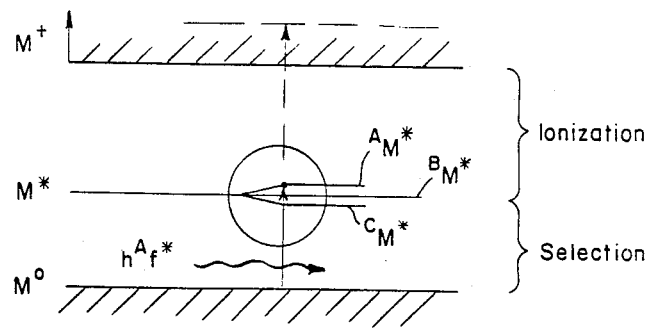
Fig. 1.
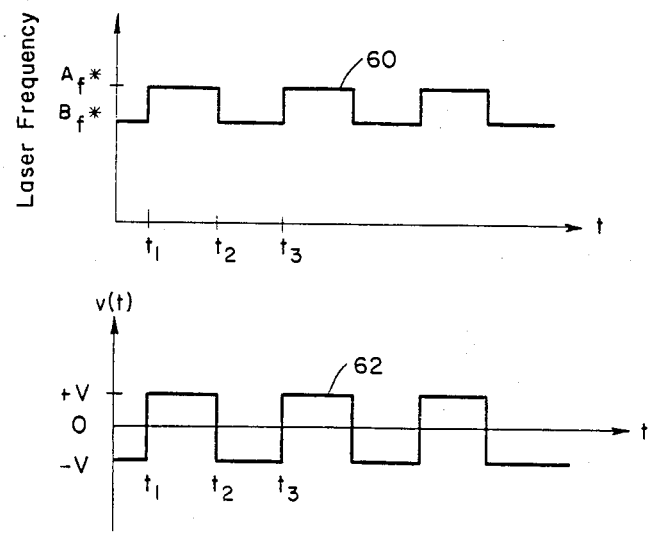
Fig. 6a.
Fig. 6b.
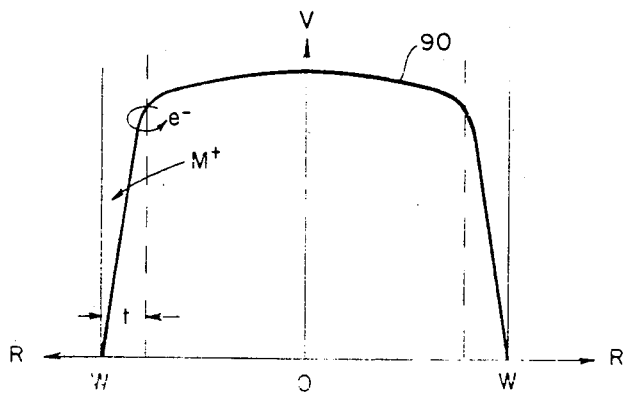
Fig. 9.

METHOD AND APPARATUS FOR SEPARATING ISOTOPES USING ELECTROPHORESIS IN A DISCHARGE

This is a continuation of application Ser. No. 151,217, filed May 19, 1980, abandoned, which is a division of application Ser. No. 700,362, filed June 28, 1976 and now abandoned.

BACKGROUND OF THE INVENTION

This invention relates to the separation of isotopes, and more particularly, it relates to isotope separation methods and apparatus wherein optical excitation is used to select the desired isotope.

The separation, or at least the enrichment, of particular isotopic forms of certain chemical elements has been of interest to the scientific community for several decades. However, in recent years, on account of the importance of obtaining enrichment of the fissionable uranium isotope $U^{235}$ for nuclear applications, a vast research and development effort has been under way to advance the state of the art of isotope separation in general and the separation of uranium isotopes $U^{235}$ and $U^{238}$ in particular.

In the past many schemes for isotope separation have been proposed and demonstrated including separation by gaseous diffusion through a porous barrier, electromagnetic separation using a mass spectrometer, centrifugal separation, separation by thermal diffusion, separation by fractional distillation, electrolytic separation, and chemical separation using isotopic exchange reactions with other elements.

A practical problem encountered with many of the aforementioned isotope separation techniques, e.g., the gaseous diffusion method, is that the enrichment ratio of the isotopes being processed (i.e., the ratio of the percentage of the desired isotope in the output mixture to the percentage of the desired isotope in the input mixture) is quite low. As a result, an extremely large number of stages are needed to obtain useful levels of enrichment of the desired isotope. For example, a ten-fold enrichment of the uranium isotope $U^{235}$ from its naturally occurring level of 0.72% would require about 1800 gaseous diffusion stages. Other of the aforementioned isotopic separation techniques, e.g., electromagnetic separation, provide substantially higher enrichment ratios than the gaseous diffusion process. However, such high enrichment ratio processes are capable of handling only small amounts of isotopic material and, therefore, are impractical for high volume use.

Recently, several isotope separation schemes have been devised based on selective optical excitation of a desired isotope in a mixture of isotopes using a tunable laser. In these schemes the laser is tuned so that its output coincides in frequency with an allowed transition of the desired isotopic species but not with that of the undesired isotopic species. The selectively excited isotopic species is subsequently ionized by either absorption of light (supplied from a second laser or an incoherent source) or by contact with a heated ionizing surface. Ions are thus produced from the excited isotope only, and these ions are physically separated from the mixture by deflection using either an electric or magnetic field, or both. In order for the deflecting forces from the electric or magnetic fields to be efficiently applied, the original isotopic mixture must exist in the form of an atomic or molecular beam so as to minimize charge exchange collisions which might scramble the excitation (i.e., ionize undesirable isotopes and deionize desired isotopes). A trade-off exists such that high isotope enrichment ratios can be achieved only at the expense of processing a very small amount of material. Further details concerning the aforementioned selective optical excitation schemes may be found in Robieux et al U.S. Pat. No. 3,443,087, Levy et al U.S. Pat. No. 3,772,519 and Pressman U.S. Pat. No. 3,740,552.

SUMMARY OF THE INVENTION

It is an object of the present invention to provide a method for separating isotopes which achieves a relatively high enrichment ratio (thereby requiring far fewer stages than methods such as gaseous diffusion for a given degree of separation) and at the same time is capable of processing relatively large quantities of isotopic material (substantially greater than is achievable with selective optical excitation methods of the prior art).

It is a further object of the invention to provide a method for separating isotopes with much lower expended energy per separated atom or molecule than has been achieved in the past.

It is a still further object of the invention to provide simple and reliable isotope separation apparatus which is far less costly than that presently in use.

In accordance with the invention a gaseous mixture containing elementary particles (atoms or molecules) of first and second isotopes is exposed to radiation at a predetermined frequency to excite elementary particles of the first isotope without substantially exciting elementary particles of the second isotope. An electric discharge is established in the gaseous mixture to produce preferential ionization of elementary particles of the first isotope. Electrophoresis in the discharge causes preferential migration of elementary particles of the first isotope to a first location and preferential migration of elementary particles of the second isotope to a second location. Portions of the gaseous mixture enriched in the first and second isotopes, respectively, are removed from the respective first and second locations.

One embodiment of the invention relies upon cataphoresis in the discharge to produce preferential migration of elementary particles of the first isotope to the vicinity of one of the discharge establishing electrodes and preferential migration of elementary particles of the second isotope to the vicinity of the other discharge establishing electrode.

Another embodiment of the invention relies upon the formation of a plasma sheath at the lateral extremity of the discharge to produce preferential migration of elementary particles of the first isotope to the vicinity of the sheath and preferential migration of elementary particles of the second isotope away from the sheath.

BRIEF DESCRIPTION OF THE DRAWING

In the accompanying drawing:

FIG. 1 is a generalized energy level diagram used in explaining the invention;

FIGS. 6a and 6b are graphs showing timing waveforms used in describing the operation of the apparatus of FIG. 5;

FIG. 9 is a graph plotting the electric potential as a function of discharge tube radius for apparatus according to FIG. 8.

DESCRIPTION OF THE PREFERRED EMBODIMENTS

Figure 2:
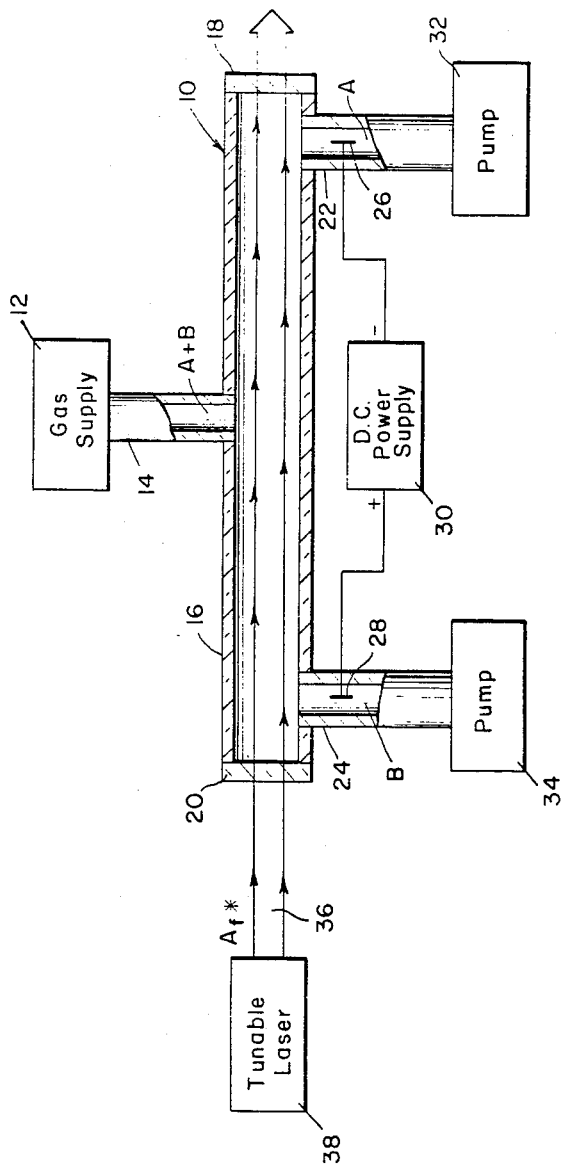
FIG. 2 is a schematic diagram, partly in block form and partly in longitudinal section, illustrating isotope separation apparatus according to one embodiment of the invention.

Referring to FIG. 1 with greater particularity, a simplified hyperfine energy level structure is shown for an atom or molecule M. It is pointed out that the principles of the invention are applicable to both atoms and molecules, and although the term "atoms" will be employed hereinafter for purposes of description, this term is intended to apply to molecules as well. As shown in FIG. 1, atom M has a ground state designated $M^\bullet$, a preselected excited state designated $M^*$, and continuum states at higher energy levels wherein the atom becomes ionized, designated $M^+$. In the atomic structure under consideration, atom M has three isotopes designated A, B and C. The hyperfine energy level structure for the atom M is such that excited state $M^*$ actually consists of the substates $^AM^*$, $^BM^*$ and $^CM^*$ for the respective isotopes A, B and C.

Incoming radiation at the frequency $^Af^*$ corresponding to the transition between the ground state and excited state $^AM^*$ is able to excite isotope A of atom M to state $^AM^*$. However, radiation at this frequency is unable to excite isotopes B and C, and isotopes B and C will remain in the ground state. Isotope A is thus excited to a level closer to the ionized levels $M^+$ than isotopes B and C.

If the atoms M are now allowed to become ionized by collisions with electrons in an electric discharge, those of isotope A, having been selectively excited as described above, will be more easily ionized than those of isotopes B and C. This occurs because the colliding electrons need only have a kinetic energy greater than the difference in energy between that of the ionization level and that of the excited atomic state. Thus, lower energy electrons are relatively more effective in ionizing atoms in state $^AM^*$ than in ground states $^BM^\bullet$ and $^CM^\bullet$. The usual distribution of electrons in an electric discharge is Maxwellian, with the probability of an electron having an energy E being proportional to $\exp(-E/kT)$, where k is Boltzmann's constant and $T_e$ is the electron temperature, a property of the discharge geometry and the atomic parameters. Thus, there are always more electrons at a lower energy than at a higher energy. As a consequence of this distribution and the selective optical excitation of isotope A, the proportion of isotope A that is ionized by the discharge will be higher than the natural isotopic abundance ratio. Thus, the ionic content of the discharge is enriched in isotope A.

An additional effect of the existence of the more easily ionized species $^AM^\bullet$ in the discharge is a decrease in the electron temperature $T_e$. Since lower energy electrons are now relatively more effective in ionizing atoms M, fewer higher energy electrons are required to maintain the discharge current, so the electric field in the discharge adjusts itself to produce fewer higher energy electrons. This effect further increases the probability of species $^AM^*$ being ionized over $^BM^\bullet$ and $^CM^\bullet$.

In accordance with the invention, isotope A is ionized by collisions with electrons in an electric discharge, and separation of the ionized particles from the un-ionized particles (hence the separation of isotope A from the remaining isotopes) is achieved by electrophoresis in the discharge. Electrophoresis is a well known phenomenon which occurs when a glow discharge burns for some time in a mixture of gases wherein different regions of the discharge become enriched in different components of the gas mixture. In one form of electrophoresis, termed cataphoresis, one component of the gas mixture migrates to the vicinity of the cathode while the other component migrates to the vicinity of the anode. In another form of electrophoresis different components of the mixture migrate across the discharge to different radial locations. For a more detailed discussion of electrophoresis in general and cataphoresis in particular, reference may be made to "The Glow Discharge at Low Pressure", Sec. 98, by Gordon Francis, *Handbuck der Physik,* Springer-Verlag, 1956, pages 195-201.

An embodiment of present invention which relies upon cataphoresis to separate the selectively excited desired isotope from the undesired isotope or isotopes is illustrated in FIG. 2. As shown, a gas containing a mixture of isotopes A and B is fed to a discharge tube 10 (which may be of a ceramic material such as alumina, for example) from a gas supply 12 via a conduit 14. For purposes of the following discussion it is assumed that isotope A is the desired isotope and isotope B includes all undesired isotopes. Discharge tube 10 is constructed with an electrically insulating tubular housing 16 having window members 18 and 20 sealed to its respective ends. The window members 18 and 20 are transparent to radiation at the exciting frequency $^Af^*$.

Discharge tube 10 is provided with lateral extensions, or sidearms, 22 and 24 near the respective ends of the tube 10 in gas flow communication with the interior of the tube 10 and in which there is mounted a cathode 26 and an anode 28, respectively. A dc power supply 30 is connected between anode 28 and cathode 26 to provide an electric potential therebetween sufficient to maintain a self-sustaining electric discharge in the gas contained within the tube 10. Discharge tube sidearms 22 and 24 are connected to repective exhaust pumps 32 and 34 which draw the gas out of the tube 10 via the sidearms 22 and 24 at a desired flow rate which enables sufficient gas pressure to be maintained within the tube 10 so that a self-sustaining electric discharge can be maintained in the gas when the aforementioned electric potential is applied between anode 28 and cathode 26. The discharge tube 10 is disposed so that a laser beam 36 at the frequency $^Af^*$, generated by a tunable laser 38, passes through the tube 10 along its longitudinal axis.

As a specific example for illustrative purposes, the discharge tube 10 may have a diameter ranging from about 0.1 cm to about 10 cm (preferably being about 1 cm), and a length ranging from about 0.1 m to 10 m (preferably being about 1 m). The gas within the tube 10 may be maintained at a pressure ranging from about 0.01 Torr to about 100 Torr (preferably being about 1 Torr). The temperature of the gas within the tube 10 may be controlled by controlling the operating temperature, which will vary depending upon the particular element whose isotopes are being separated. Temperature control may be achieved by enclosing the apparatus within a suitable oven or ovens (not shown). The electric potential applied between discharge tube electrodes 26 and 28 may be such as to maintain an electric field-to-gas pressure ratio E/P ranging substantially from 1 to 100 volts/Torr-cm.

By the selective optical excitation process described above, laser beam 36 selectively excites atoms of isotope A of the mixture of isotopes A and B in the gas flowing through the tube 10, while atoms of isotope B remain in the ground state. When an electric discharge is commenced in the gas within tube 10 by applying the aforementioned potential between anode 28 and cathode 26, gas atoms become ionized by collisions with the discharge electrons. Since atoms of isotope A have been made more easily ionizable than atoms of isotope B by the selective excitation process, isotope A atoms are preferentially ionized over isotope B atoms. Cataphoresis in the discharge causes preferential migration of the ions toward the cathode 26 and preferential migration of the neutral gas atoms toward the anode 28. Since the ions are enriched in isotope A and the neutral gas atoms are enriched in isotope B over their originally occurring ratios, the gas in the vicinity of cathode 26 becomes enriched in Isotope A and that in the vicinity of anode 28 becomes enriched in isotope B. The isotope A enriched gas may be removed from sidearm 22 by means of pump 32, while the isotope B enriched gas (which is depleted in isotope A) may be removed from sidearm 24 by pump 34.

Figure 3:
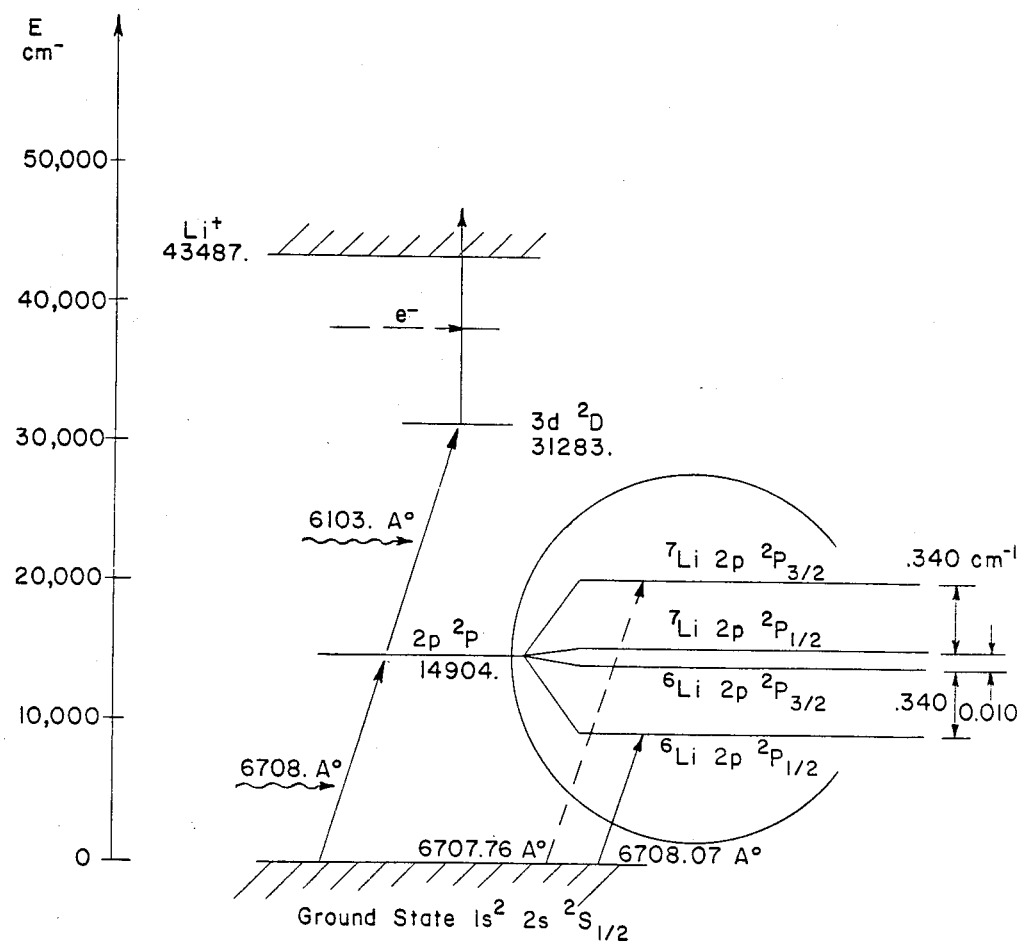
FIG. 3 is a more detailed energy level diagram for a particular exemplary isotopic mixture and excitation scheme which the invention may utilize.

As an illustrative example, the aforementioned embodiment of the invention may be used to separate the lithium isotopes $Li^6$ and $Li^7$. An energy level diagram illustrating a specific excitation process for lithium atoms is given in FIG. 3. Incoming laser radiation at about 6708 A° is employed to selectively excite the desired lithium isotopic species from the ground state ($1s^2 2s\ ^2S_{\frac{1}{2}}$) to the 2p $^2P$ state. A laser beam at this frequency may be generated by a Rhodamine B dye laser. A specific exemplary dye laser which may be employed is Model 599 manufactured by Coherent Radiation Laboratories. As shown in FIG. 3, in a mixture of lithium isotopes $Li^6$ and $Li^7$, the 2p $^2P$ state actually consists of four energy states, the greatest in energy being the $^7Li$ 2p $^2P_{3/2}$ and the smallest in energy being the $^6Li$ 2p $^2P_{\frac{1}{2}}$ state. If it is desired to excite $Li^6$ atoms (i.e., if $Li^6$ corresponds to isotope A in the foregoing discussion), the laser is tuned to 6708.07 A°. On the other hand, if it is desired to excite $Li^7$ atoms, the incoming laser radiation should be tuned to 6707.76 A°.

Although exposure of the lithium isotopic mixture to the desired laser radiation at about 6708 A° will enable the desired lithium isotope to be preferentially ionized in the ensuing electric discharge, a greater degree of ionization selectivity can be achieved by employing at least one additional laser excitation step to excite the desired isotope to an energy level closer to the ionization level. As shown in FIG. 3, lithium atoms which have been excited to the 2p $^2P$ state may be further excited to the 3d $^2D$ state by exposing the lithium isotopic mixture to laser radiation at about 6103 A°. This may be achieved by employing a second laser tuned to about 6103 A° and coupling both the 6103 A° and the 6708 A° radiation into the tube containing the isotopic mixture via a beamsplitter, for example. Laser radiation at 6103 A° may be generated by a Rhodamine 6G dye laser, the aforementioned specific exemplary dye laser Model 599 also being suitable for generating a laser beam at about 6103 A°. It should be pointed out that the laser radiation at 6103 A° must be tuned to correspond precisely to the energy difference between the 3d $^2D$ state and the particular 2p $^2P$ substrate (i.e., $^6Li$ 2p $^2P_{\frac{1}{2}}$ or $^7Li$ 2p $^2P_{3/2}$) to which the desired lithium isotope has been previously excited.

As a further alternative, increased ionization selectivity for the desired lithium isotope can be achieved by utilizing a third laser beam at about 8234 A° to excite previously excited lithium atoms in the 3d $^2D$ state to the 42p $^2P_{3/2}$ state which lies only 63 cm$^{-1}$ below the ionization potential of lithium.

As a still further alternative, a two-step optical excitation process may be employed wherein once excited lithium atoms in the 2p $^2P$ state are excited to the 4d $^2D$ state by a laser beam at about 4603 A°. The lithium 4d $^2D$ state lies closer to the ionization potential of lithium than the 3d $^2D$ state and hence achieves greater ionization selectivity than the process depicted in FIG. 3, although not as high as that which may be achieved when a third laser is employed.

When lithium is the working element employed in the apparatus of FIG. 2, gas supply 12 would include an oven for heating the lithium to the vaporization temperature T corresponding to the desired operating gas pressure. The discharge tube 10 and the interconnecting tubing would be maintained at a temperature somewhat in excess of the vaporization temperature T. The vaporization temperature corresponding to lithium vapor at a pressure of 1 Torr is 1020° K.

A few examples of other elements whose isotopes may be separated by means of the present invention are listed below in Table I. The information given in this table includes the element in question, the particular isotopes to be separated, the vaporization temperature T corresponding to an operating gas pressure of 1 Torr, the wavelength λ of the resonance radiation from the ground state to a selected excited state, a dye laser suitable for generating such resonance radiation, and the wavelength shift between substrates of the given excited state for the isotopes to be separated. It is pointed out that if greater ionization selectivity is desired in the ensuing electric discharge, additional laser excitations from the indicated excited state to one or more higher energy states may be employed in a manner similar to that described above with respect to lithium.

TABLE I

| Element | Isotopes | T (°K.) | λ (A*) | Dye Laser | Isotopic Shift (cm$^{-1}$) |
|---|---|---|---|---|---|
| Europium | 151, 153 | 1100 | 5765 | Rhodamine 110 | 0.120 |
| Ytterbium | 172, 176 | 1060 | 5556 | Sodium fluorescein | 0.065 |
| Uranium | 235, 238 | 2720 | 5915 | Rhodamine 60 | 0.281 |

It should be understood that the foregoing listing is purely illustrative, and other elements, isotopes and design parameters may be used in accordance with the invention.

It is further pointed out that because of neutral gas diffusion and excitation scrambling, some of the isotope A particles will exit the anode end of the discharge tube 10 of FIG. 2 and some of the isotope B particles will exit the cathode end. Thus, the arrangement of FIG. 2 does not achieve complete separation of the isotopes A and B, but rather merely produces enrichment of the isotopes A and B as its respective outputs. However, arrangements according to the invention may be cascaded in a multi-stage chain to achieve a desired level of isotope enrichment. The cascading of individual isotope enrichment stages is well known for gaseous diffusion and centrifuge schemes of the prior art and is discussed in detail in the book by Karl Cohen, *The Theory of Isotope Separation as Applied to Large-Scale Production of $U^{235}$*, McGraw-Hill, 1951, Chapters 1 through 4.

Figure 4:
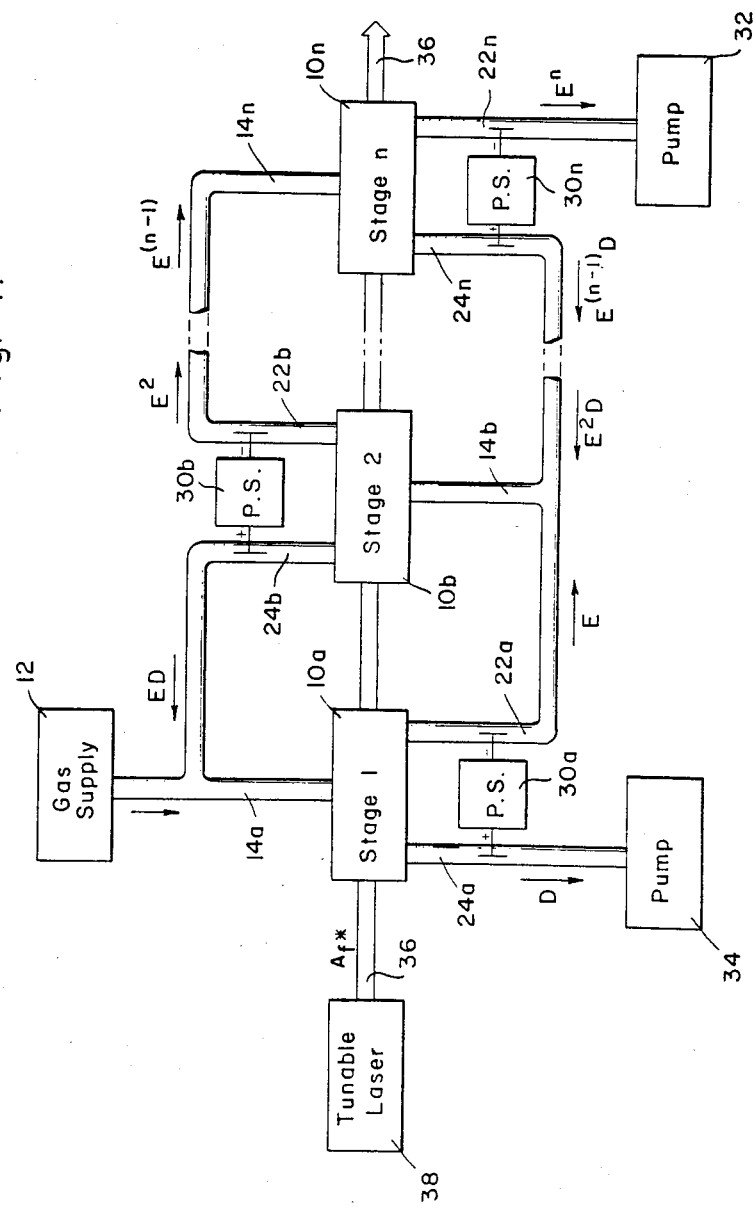
FIG. 4 is a schematic diagram illustrating how isotope separation apparatus according to FIG. 2 may be cascaded in a multi-stage chain.

A specific cascaded arrangement utilizing isotope separation apparatus according to FIG. 2 is illustrated in FIG. 4. Components in the arrangement of FIG. 4 which are the same as respective components in the arrangement of FIG. 2 are designated by the same reference numerals as their corresponding components in FIG. 2 and, where appropriate, also bear a suffix designation "a", "b" ... "n" to identify the particular stage (i.e., first, second ... nth) wherein these components are employed. In the specific arrangement illustrated in FIG. 4 the laser beam 36 is passed through the various discharge tube stages 1, 2 ... n. Stage 1 produces at output port 22a gas mixture E which is enriched in isotope A and produces at output port 24a gas mixture D which is depleted in isotope A. The enriched output E from stage 1 is combined with the depleted output $E^2D$ from stage 3 (not shown) to provide the input to stage 2. The depleted output ED from stage 2 is combined with the original mixture from gas supply 12 to provide the input to stage 1, while the enriched output $E^2$ from stage 2 is utilized as one input to stage 3, etc. Finally, the overall enriched output from the system $E^n$ is removed from the stage n by pump 32.

Figure 5:
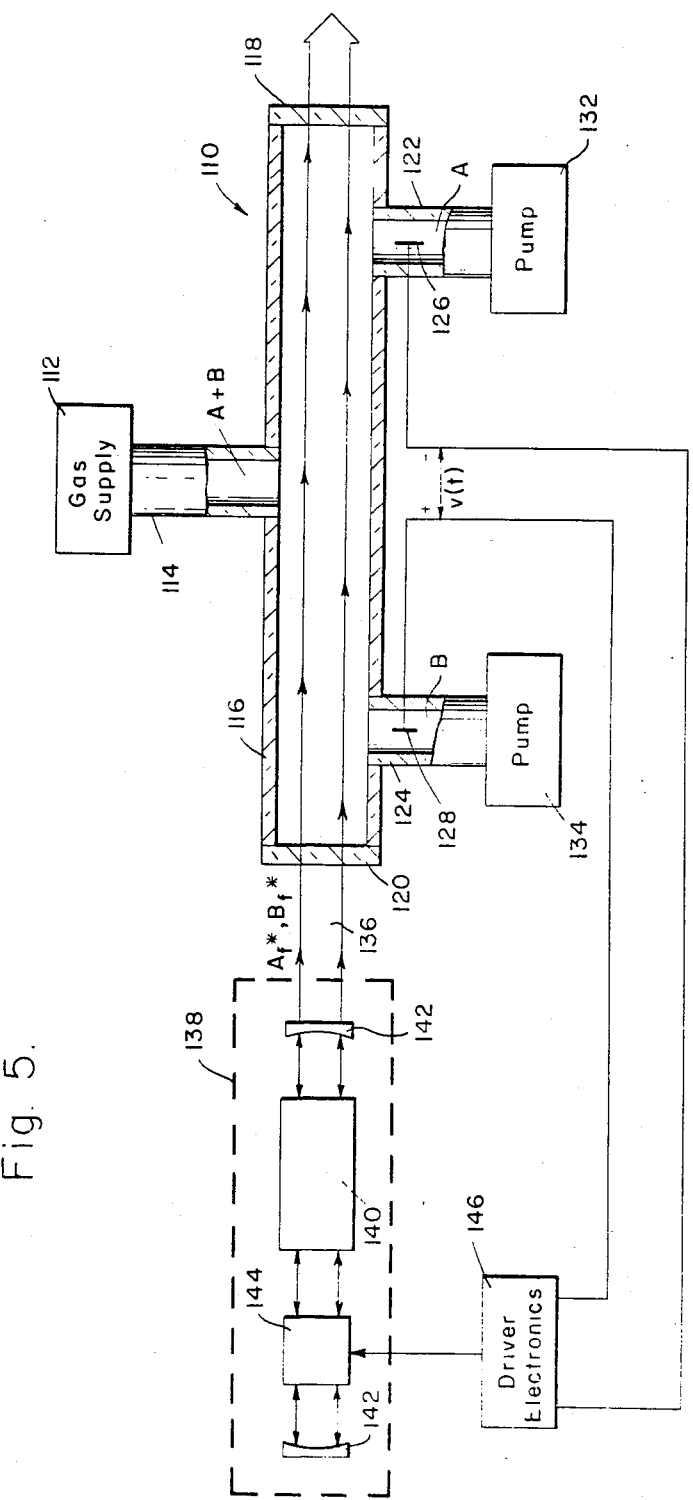
FIG. 5 is a schematic diagram, partly in block form and partly in longitudinal section, showing isotope separation apparatus according to an alternate embodiment of the invention.

An alternate embodiment of the invention, in which an ac discharge tube drive voltage is employed, is illustrated in FIG. 5. Components in the embodiment of FIG. 5 which correspond to respective components of the embodiment of FIG. 2 are designated by the same second and third reference numeral digits as their counterpart components in FIG. 2, along with the addition of a prefix numeral "1". The embodiment of FIG. 5 differs from that of FIG. 2 in that the laser frequency is switched to alternately excite the desired isotope A and the most populous undesired isotope B, and the polarity of the discharge establishing voltage is switched in synchronism with the laser frequency to apply a positive cataphoretic separating force to isotope B as well as A.

In the embodiment illustrated in FIG. 5 tunable laser 138 includes a laser medium 140 disposed between a pair of reflectors 142, with a voltage tuned filter 144 (such as an acoustic wave filter) disposed between laser medium 140 and one of the reflectors 142. Drive electronics 146 applies an appropriate control signal to filter 144 to vary the optical path length through the filter 144 and thereby vary the oscillation frequency of laser 138 accordingly. At the same time, driver electronics 146 applies a voltage v(t) of reversing polarity between discharge tube electrodes 128 and 126. The voltage v(t) is synchronized with the control voltage applied to the filter 144 such that the polarity of the discharge established in tube 110 is reversed in synchronism with alternations in the oscillation frequency of the laser 138.

Operation of the embodiment of FIG. 5 will now be discussed in more detail with reference to waveform 60 of FIG. 6a, illustrating the oscillation frequency of the laser 138 as a function of time, and waveform 62 of FIG. 6b, showing the discharge tube drive voltage v(t) as a function of time. At time $t_1$, the control voltage applied to the filter 144 sets the oscillation frequency of the laser 138 to the frequency $^Af^*$, and at the same time the voltage v(t) is such as to make electrode 128 positive with respect to electrode 126. During the ensuing time interval $t_1-t_2$, laser beam 136 selectively excites atoms of isotope A which are preferentially ionized in the discharge established in tube 110, and isotope A ions preferentially migrate to the vicinity of electrode 126 (which is now the cathode) due to cataphoresis in the discharge. At time $t_2$ the control voltage applied to filter 144 is switched to change the frequency of the generated laser beam to $^Bf^*$, and the polarity of the voltage v(t) is changed to make electrode 126 positive with respect to electrode 128. During the ensuing time interval $t_2-t_3$, atoms of isotope B are selectively excited and preferentially ionized, and ions of isotope B are caused to migrate to the vicinity of electrode 128 (which is now the cathode) due to cataphoresis in the discharge. At time $t_3$, the laser frequency control voltage and the discharge tube drive voltage v(t) are switched back to their values existing at time $t_1$, and the process is repeated as described above.

Figure 7:
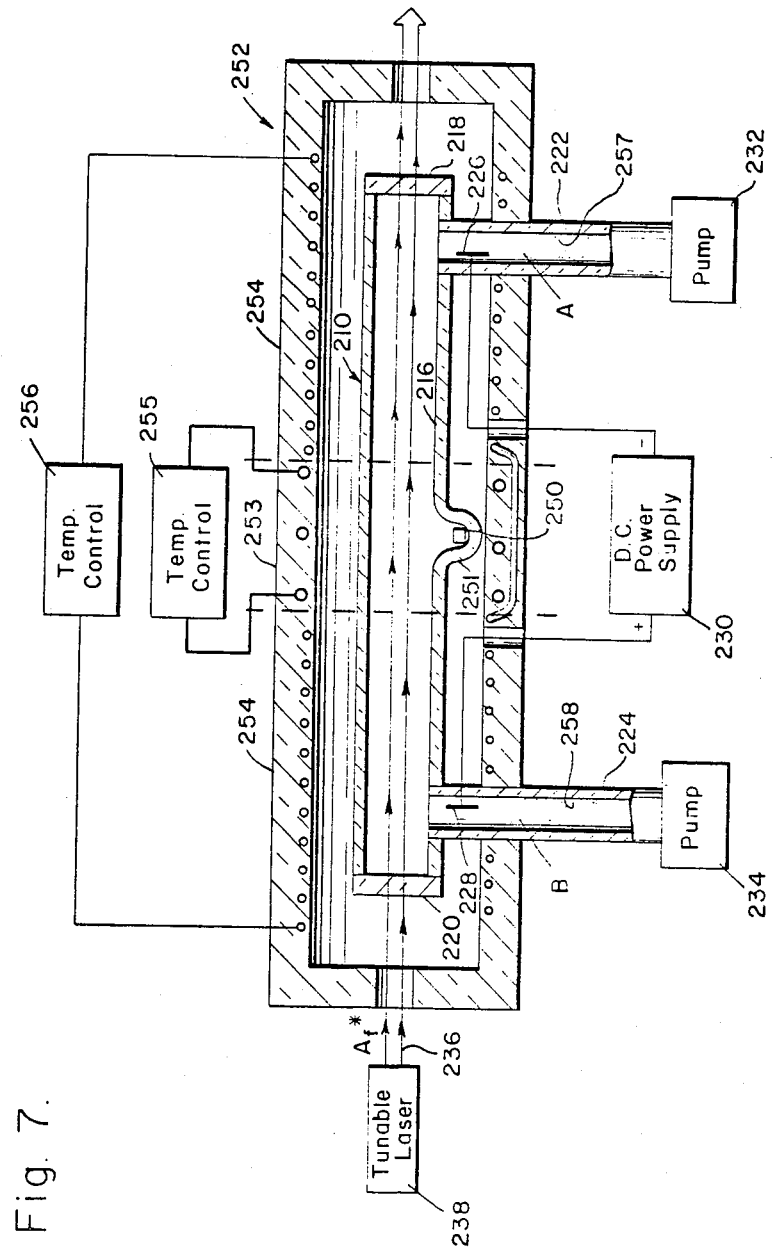
FIG. 7 is a schematic diagram, partly in block form and partly in longitudinal section, illustrating isotope separation apparatus according to another embodiment of the invention.

Another embodiment of the invention, which is especially suitable for separating isotopes of materials which are solid or liquid at room temperature, is illustrated in FIG. 7. Components in the embodiment of FIG. 7 which correspond to respective components of the embodiment of FIG. 2 are designated by the same second and third reference numeral digits as their counterpart components in FIG. 2, along with the addition of a prefex numeral "2". The embodiment of FIG. 7 differs from that of FIG. 2 in that the isotopic material to be separated is vaporized in the isotope separating discharge tube, and the isotopic material is processed in a batch process.

As shown in FIG. 7, a mass 250 of solid or liquid isotopic material to be separated is disposed in a receptacle portion 251 of discharge tube 210 located substantially midway along the length of the tube 210. Discharge tube 210 is mounted within an oven 252 which is open at both ends to permit the passage of laser beam 236 through the tube 210. Oven 252 has a central portion 253 surrounding the region of discharge tube 210 containing mass 250 and has longitudinally outer portions 254 surrounding the remainder of the discharge tube 210. The central portion 253 of oven 252 is controlled by a first temperature control 255, while the outer portions 254 of oven 252 are controlled by a second temperature control 256. Temperature control 255 is adjusted to heat the region immediately surrounding the mass 250 to the aforementioned vaporization temperature T, while temperature control 256 is adjusted to maintain the temperature of the other regions within the oven 252 at a temperature somewhat in excess of the vaporization temperature T. The isotopes A and B condense on the walls of the respective discharge tube extensions 222 and 224 in respective regions 257 and 258 outside of the oven 252. The pumps 232 and 234 function to remove any contaminants from the interior of the discharge tube 210.

Figure 8:
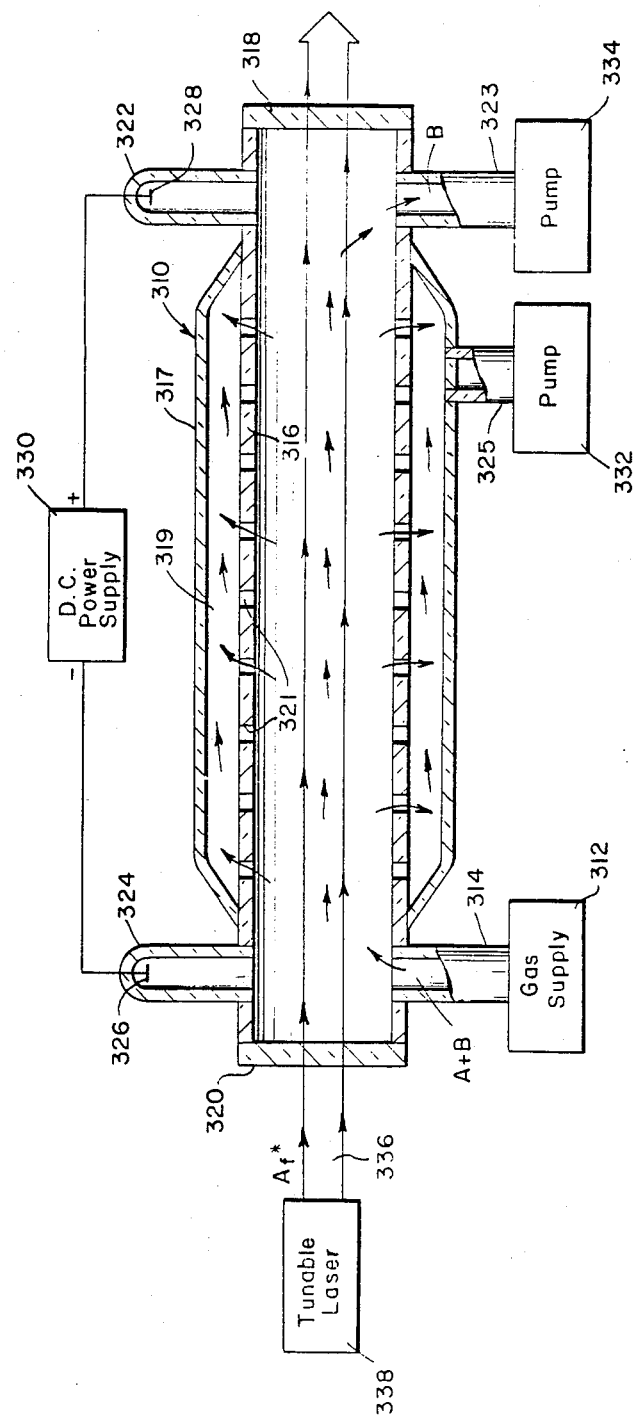
FIG. 8 is a schematic diagram, partly in block form and partly in longitudinal section, showing isotope separation apparatus according to a still further embodiment of the invention.

As was mentioned above, electrophoresis can also occur in a transverse, or radial, direction across an electric discharge. This effect is due to formation of a plasma sheath adjacent to the lateral wall of the discharge tube. A further embodiment of the present invention in which enrichment of a desired isotope is achieved in such a plasma sheath is illustrated in FIG. 8. Components in the embodiment of FIG. 8 which correspond to respective components of the embodiment of FIG. 2 are designated by the same second and third reference numeral digits as their counterpart components in FIG. 2, along with the addition of a prefix numeral "3".

In the embodiment of FIG. 8 a double-walled discharge tube 310 is employed having coaxial inner and outer electrically insulating tubular housings 316 and 317, respectively. Outer housing 317 is sealed to inner housing 316 a short distance from the respective ends of housing 316 to form an elongated annular chamber 319 between the housings 316 and 317. Gas flow communication is provided between chamber 319 and the interior of housing 316 by means of an array of holes 321 through housing 316. Cathode 326 is disposed in radially outwardly projecting sidearm 324 of housing 316 adjacent to one end thereof, while anode 328 is disposed in radially outwardly projecting sidearm 322 of housing 316 adjacent to the opposite end thereof. The gaseous mixture of isotopes A and B from gas supply 312 is introduced into the housing 316 at one end thereof via conduit 314. Undesired isotope B is removed from the other end of housing 316 via a conduit 323 connected between housing 316 and exhaust pump 334. Desired isotope A is removed from chamber 319 via a conduit 325 connected between housing 317 and exhaust pump 332.

Operation of the isotope separation apparatus of FIG. 8 will now be discussed with reference to the graph of FIG. 9 in which curve 90 illustrates the electric potential V as a function of radial distance R across the discharge tube 310. In FIG. 9 the radial location corresponding to the wall of housing 316 is designated W. The electron temperature $T_e$ and the random electron velocity $v_e$ in the discharge within the housing 316 are much higher than the corresponding temperature $T_i$ and velocity $v_i$ of the discharge ions. Since the wall of housing 316 is of insulating material, the net current flow i to it (neglecting secondary emission) must be zero, so that $$i_i + i_e = 0, \quad (1)$$

where $i_i$ is the ion current and $i_e$ is the electron current.
Equation (1) may be rewritten as $$en_i v_i - en_e v_e = 0, \quad (2)$$

where e is the electronic charge, and $n_i$ and $n_e$ are the number of ions and electrons, respectively, in the discharge. Since the discharge must have approximate charge neutrality, $$n_i \approx n_e. \quad (3)$$

Substituting equation (3) in equation (2) would require $v_i \approx v_e$, but such condition is not met in the body of the discharge plasma. Rather, a potential barrier, or sheath, forms adjacent to the wall W of the housing 316 which reflects electron $e^-$ back into the body of the plasma and accelerates ions $M^+$ toward the wall, as indicated schematically in FIG. 9. The plasma sheath adjusts its thickness t to exactly satisfy equation (2) at the wall W, while allowing equation (3) to be valid in the body of the plasma. Further details concerning the theory and mathematical analysis of the formation of a plasma sheath in a cylindrical glow discharge may be found in the article by Jerald V. Parker, "Collisionless Plasma Sheath in Cylindrical Geometry", *Physics of Fluids*, Vol. 6 (1963), pages 1657–1658.

By the selective optical excitation process described above, laser beam 336 selectively excites atoms of isotope A of the mixture of isotopes A and B in the gas flowing through discharge tube 310, while atoms of isotope B remain in the ground state. When an electric discharge is commenced in the gas within tube 310 by applying the approximate electric potential between anode 328 and cathode 326, gas atoms become ionized by collisions with the discharge electrons. Since atoms of isotope A have been made more easily ionizable than atoms of isotope B by the selective excitation process, the ion density in the discharge becomes greatly enriched in ions of isotope A. As a result of the formation of a plasma sheath adjacent to the wall of the housing 316, ions migrate to the vicinity of the wall of housing 316 and are drawn through the holes 321 into the chamber 319. Since the ions are enriched in isotope A, isotope A enriched gas accumulates in chamber 319 and may be removed from the apparatus via conduit 325 by means of pump 332. On the other hand, the gas atoms which migrate to the vicinity of the axis of the tube 310 are depleted in isotope A (enriched in isotope B). The isotope B enriched gas may be removed from the apparatus via conduit 323 by means of pump 334. The gas flow path through the apparatus is indicated by arrows in FIG. 8.

It is pointed out the arrangement of FIG. 8 does not achieve complete separation of the isotopes A and B, but rather merely produces enrichment of these isotopes as its respective outputs. Incomplete separation occurs because some gas atoms of isotope B migrate to the vicinity of the wall of housing 316 and becomes drawn through the holes 321, some atoms of isotope B become nonselectively ionized, and some charge exchange collisions occur between ions of isotope A and atoms of isotope B which scramble the selective excitation. However, a desired level of enrichment can be readily achieved because the embodiment of FIG. 8 lends itself to cascading, and individual stages according to FIG. 8 may be cascaded in a multi-stage chain in a manner similar to that shown and described above with respect to FIG. 4.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A method for separating isotopes of a gaseous mixture containing elementary particles of first and second isotopes comprising the steps of:
   exposing said gaseous mixture to radiation at a predetermined frequency to excite elementary particles of said first isotope without substantially exciting elementary particles of said second isotope;
   establishing an electric discharge in said gaseous mixture in a region where it is exposed to said radiation to produce preferential positive ionization of elementary particles of said first isotope, said discharge forming a plasma sheath at its lateral extremity, whereby elementary particles of said first isotope preferentially migrate to a first location in the vicinity of said lateral extremity and elementary particles of said second isotope preferentially migrate to a second location away from said lateral extremity; and removing from said first and second locations respective portions of said gaseous mixture enriched in said first and second isotopes, respectively.

2. Apparatus for separating isotopes of a gaseous mixture containing elementary particles of first and second isotopes comprising:

an elongated substantially cylindrical housing;

first and second electrodes disposed in said housing near the respective ends thereof;

means for providing said gaseous mixture within said housing;

means for exposing said gaseous mixture within said housing in a region between said first and second electrodes to radiation at a predetermined frequency to excite elementary particles of said first isotope without substantially exciting elementary particles of said second isotope;

means for applying between said first and second electrodes an electric potential sufficient to establish an electric discharge in said gaseous mixture within said housing, said discharge producing preferential positive ionization of elementary particles of said first isotope and forming a plasma sheath adjacent to the lateral surface of said housing, whereby elementary particles of said first isotope preferentially migrate to the vicinity of said housing lateral surface and elementary particles of said second isotope preferentially migrate to the vicinity of the axis of said housing; and means for removing a portion of said gaseous mixture enriched in said first isotope from the vicinity of said housing lateral surface and a portion of said gaseous mixture enriched in said second isotope from the vicinity of said housing axis.

3. Apparatus for separating isotopes of a gaseous mixture containing elementary particles of first and second isotopes comprising:

a first elongated substantially cylindrical electrically insulating housing;

a second elongated substantially cylindrical electrically insulating housing coaxially disposed about said first housing and having its ends sealed to said first housing, said first housing extending longitudinally beyond said second housing and defining along its length an array of holes therethrough to provide gas flow communication between the interior region of said first housing and the annular region between said first and second housings;

first and second electrodes disposed in said first housing near the respective ends thereof;

means for introducing said gaseous mixture into said first housing adjacent one end thereof and at a predetermined pressure sufficient to support an electric discharge;

means for exposing said gaseous mixture within said first housing in a region between said first and second electrodes to radiation at a predetermined frequency to excite elementary particles of said first isotope without substantially exciting elementary particles of said second isotope;

means for applying between said first and second electrodes an electric potential sufficient to establish an electric discharge in said gaseous mixture within said first housing, said discharge producing preferential positive ionization of elementary particles of said first isotope and forming a plasma sheath adjacent to the inner lateral surface of said first housing, whereby elementary particles of said first isotope preferentially migrate to the vicinity of said housing lateral surface and elementary particles of said second isotope preferentially migrate to the vicinity of the axis of said first housing;

means for causing a first portion of said gaseous mixture located in the vicinity of said housing lateral surface and enriched in said first isotope to flow through said holes into said annular region between said first and second housings and for removing said first portion of said gaseous mixture therefrom; and means for removing a second portion of said gaseous mixture enriched in said second isotope from said first housing adjacent the end thereof remote from the region of introduction of said gaseous mixture into said first housing.

* * * * *